Dec. 18, 1928. 1,696,014
W. L. REMICK
APPARATUS FOR THE TREATMENT OF SOLID BEARING SOLUTIONS
Filed Sept. 17, 1925 2 Sheets-Sheet 1
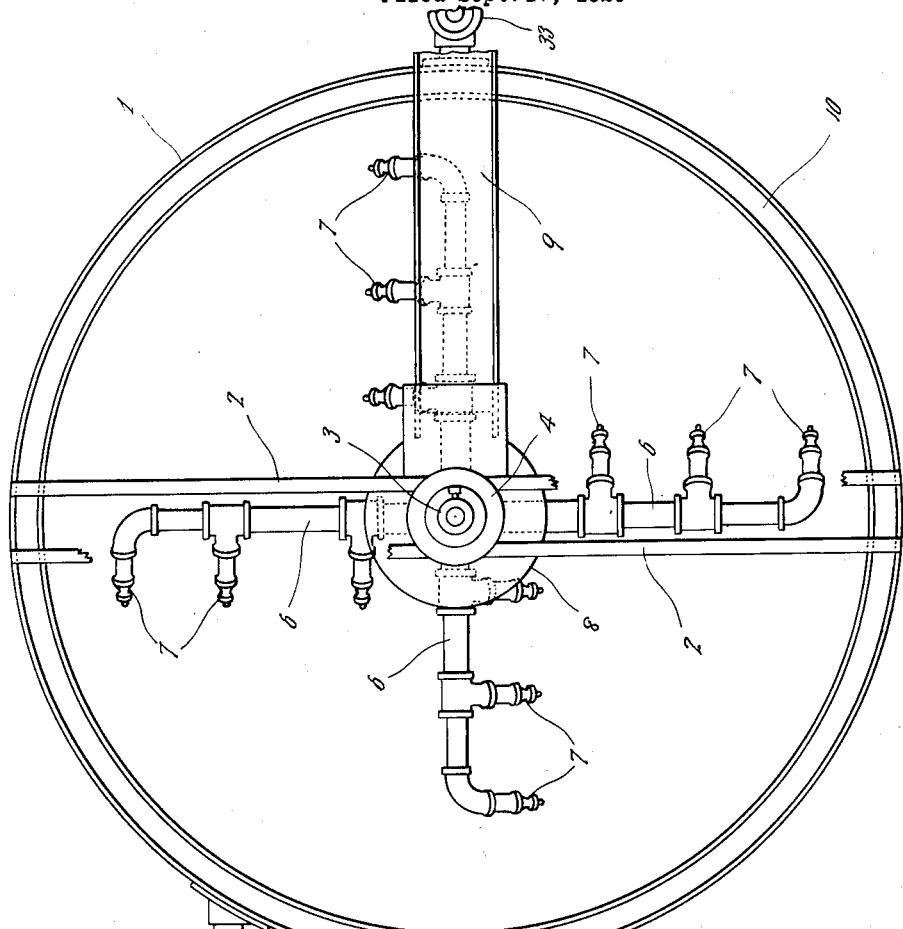
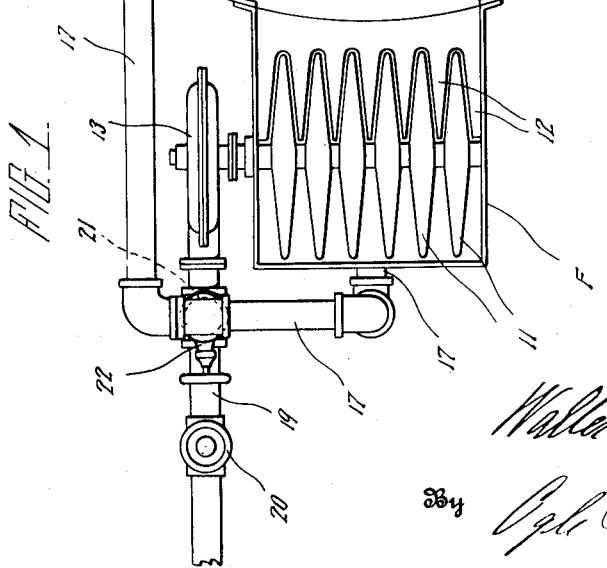
Inventor:
Walter L. Remick
By Ogle R. Singleton
Attorney Dec. 18, 1928.  
W. L. REMICK  
1,696,014  
APPARATUS FOR THE TREATMENT OF SOLID BEARING SOLUTIONS  
Filed Sept. 17, 1925   2 Sheets-Sheet 2
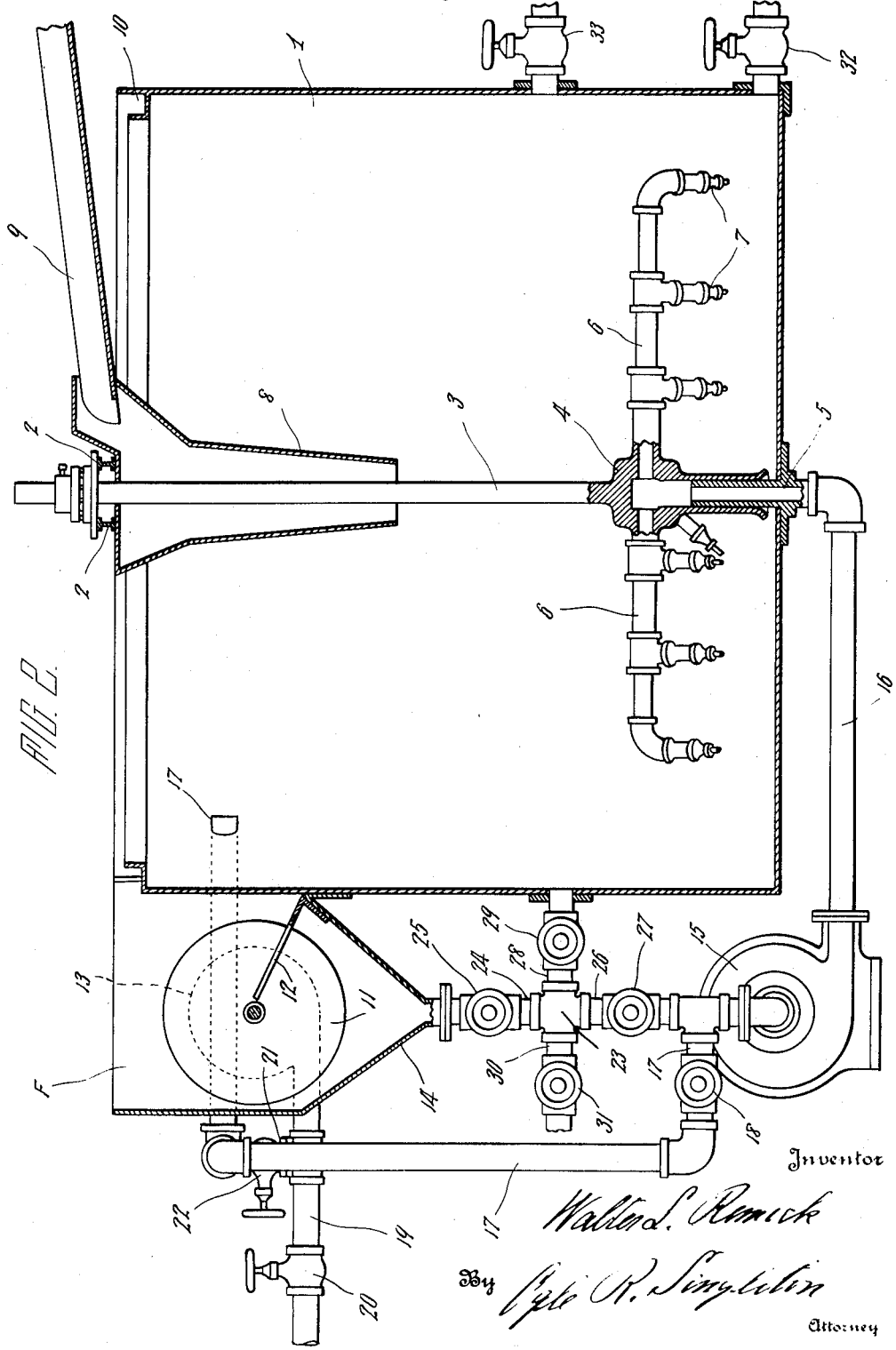

Patented Dec. 18, 1928.

1,696,014

UNITED STATES PATENT OFFICE.

WALTER L. REMICK, OF PHILADELPHIA, PENNSYLVANIA.

APPARATUS FOR THE TREATMENT OF SOLID-BEARING SOLUTIONS.

Application filed September 17, 1925. Serial No. 56,917.

My invention consists in a new and useful improvement in apparatus for the treatment of solid-bearing solutions and has for its purpose the thickening and dewatering of the solids and the clarifying and filtering of the solution, and is designed more particularly for the treatment of solutions having in suspension solids such as coal or other minerals. My improved apparatus consists of the details of construction hereinafter fully described by which I am enabled to practice my improved process.

Figure 1 is a top plan view of my apparatus.

Figure 2 is a vertical section of my apparatus.

A suitable open-top tank 1 is provided with cross-rails 2 spanning the top, and suitably journaled on these rails 2 is the rotatable shaft 3 having at its bottom end the hollow head 4 in which is received the upstanding pipe 5 passing through the bottom of the tank 1. Attached to the head 4 are the radially disposed pipes 6 provided with series of tangentially downwardly projected disposed nozzles 7. A tubular feed-shell 8 is suitably mounted in the upper part of the tank 1, surrounding the shaft 3. Into this shell 8 there is inserted a feed chute 9 for the delivery of the material to the tank 1. The tank 1 is provided at its top with a circumferential launder 10, adapted to discharge into the filter F which is provided with the rotary filter discs 11, scrapers 12, suction pump 13 and hopper 14.

I provide a centrifugal pump 15 with its delivery side connected to the pipe 5 by a pipe 16 and its intake side in communication with the upper part of the tank 1 by a pipe 17. A valve 18 is provided in this pipe 17 adjacent the pump 15. The outlet pipe 19 of the pump 13 in the filter F has a valve 20 therein, and a by-pass 21 communicating with the pipe 17 and having a valve 22. Below the hopper 14 of the filter F, I provide a cross 23, connected by pipe 24 with valve 25 to the hopper 14, by pipe 26 with valve 27 to pipe 17, by pipe 28 with valve 29 to the interior of the tank 1 at a level slightly above the plane of the pipes 6, and to pipe 30 with valve 31 for discharge. The tank 1 is also provided with a suitable draw-off valve 32, and a discharge valve 33 at a point at a level with the discharge pipe 28.

From the foregoing description of the structure of my apparatus, its operation will be obvious. A solution bearing minute particles of solids, such as pulverized coal, is introduced into the tank 1 through the chute 9 and feed-shell 8. When the tank 1 becomes filled, the pump 15 is operated, causing the solution to flow from the tank 1, through the out-flow pipe 17 and be returned through the pipes 16 and 5, the head 4, pipes 6 and nozzles 7. By reason of the disposition of these parts, the flow of the solution causes the pipes 6 to rotate and the inflowing solution causes agitation in the bottom of the tank 1. The passage of the solution through the tank 1, as above described, causes the heavier particles of solids to settle toward the bottom of the tank, the agitation at the bottom causing sufficient upflow to bring about the thickening of the solids up to the level of the intake pipe 17.

This thickening process results in the partial clarifying of the solution which flows from the top of the tank 1 through the launder 10 into the filter F, where the solution is filtered, such minute particles of solids as still remain in the solution being filtered out into the filter hopper 14, the filtered solution passing from the filter F through the pipe 19. The construction of my apparatus is such that I can discharge the solids recovered from the filter by passing them through the pipes 24 and 30, or I can introduce them into the thickened solids in the tank by passing them through the pipes 24 and 28, or I can reintroduce them into the circulation of the solution in the tank through pipes 24 and 26. The clarified solution recovered from the filter F may be discharged from the apparatus through the pipe 19, or may be re-introduced into the tank 1 by the by-pass 21 to the pipe 17. The thickened solids may be drawn from the tank 1 through the valves, 32 or 33.

From the foregoing description of the operation of my apparatus, it will be obvious that I have provided means by which I can secure a wide range of control of the process of thickening and dewatering the solids and clarifying and filtering the solution. Thus it will be seen that if the apparatus is to be used for the purpose of recovering the solids from the solution, this end is obtained by the combined processes of thickening by settling in the tank 1 and by the removal of the minute particles in the filter, and their re-introduction to the thickened mass in the tank. If the apparatus is to be used for the clarifying and filtering of the solution, this end is obtained by the clarifying of the solution by the settling of the solids in the tank, and filtering of the solution in the filter. And it is also to be noted that the apparatus can be adjusted in such a way as to perform in the same operation both of the above described processes, viz, the thickening and dewatering of the solids and also the clarifying and filtering of the solution.

It is a well known fact that thickeners which depend for their action upon the settling velocities of solids in solutions, have definite limits of capacity. These limits depend upon the settling velocities of the solids in question in the solution used. This capacity depends also upon the area of the tank surface from which clear effluent may be overflowed. When fed beyond this limiting capacity, solids escape in the overflow in proportion to the excess of solution fed to the tank.

The capacity of the filter depends upon the area of effective filtering surface, and, assuming a constant feed of solution, upon the nature and amount of solids suspended in the solution.

For a given material suspended in a constant volume of solution the filtering capacity depends upon the percentage of solids in suspension and the ability of the machine to clear itself and expose clean filtering surface at each revolution of the drum or discs.

My invention has for its purpose the removal of these limitations of the thickener and the filter. The bulk of the solids is removed by thickening in the tank 1. It will be seen that when the tank 1 is fed beyond its natural capacity to clarify, it will overflow the finer sizes of the solids and that the size of the coarsest of the solids in this overflow may be closely regulated by control of the volume of solution fed. This is true because of the fact that the tank acts as an ideal hydraulic classifier. This makes my apparatus a very valuable machine for desliming coarse ground materials or for separating the coarse from the fine sizes. Ordinarily this overflow would be caught in another tank or allowed to go to waste. In this invention the overflow passes to the rotary filter and is wholly freed of its solid contents.

To summarize, I have in this process removed the limiting factors from the thickener by allowing a pre-determined percentage of the solids to overflow. I have removed one of the limiting factors in the operation of the filter, by reducing the percentage of solids in the solution to a minimum by removing most of them in the tank 1. The result is a very flexible process which has the combined capacity of the two machines plus an added increment made possible by the reduction of solids in the solution passing to the filter.

Having described my invention, what I claim is:—

1. In an apparatus for the treatment of solid-bearing solutions, the combination of a tank; a filter so related to said tank as to receive material discharged from said tank and provided with a receptacle for the solids recovered by the filter; means adapted to convey the solids from the receptacle to said tank; and means adapted to return the filtered liquid discharged by the operation of said filter to said tank.

2. In an apparatus for the treatment of solid-bearing solutions, the combination of a settling tank; an overflow launder on said tank; a filter connected to said launder, having a hopper for the solids recovered by the filter, and a discharge pipe for the filtered solution; a pipe connecting the hopper with the tank; and a second pipe connecting the discharge pipe with the tank.

3. In an apparatus for the treatment of solid-bearing solutions, the combination of a settling tank; a liquid circulating system adapted to circulate solution through said tank; an overflow launder on said tank; a filter connected with said launder and having a hopper for the solids recovered by the filter and a discharge pipe for the filtered solution; a pipe connecting the hopper with the interior of the tank; a second pipe connecting the hopper with the liquid circulating system; a third pipe serving as a discharge from the hopper; and a pipe connecting the discharge pipe of the filter with the liquid circulating system.

In testimony whereof I affix my signature.

WALTER L. REMICK.